(12) United States Patent
Preston

(10) Patent No.: US 9,108,575 B2
(45) Date of Patent: Aug. 18, 2015

(54) CONFIGURABLE AND PORTABLE DEVICE FOR HOLDING ACCESSORIES ON MOTOR VEHICLE DASHBOARDS

(71) Applicant: James Michael Preston, Santa Clara, CA (US)

(72) Inventor: James Michael Preston, Santa Clara, CA (US)

( * ) Notice: Subject to any disclaimer, the term of this patent is extended or adjusted under 35 U.S.C. 154(b) by 122 days.

(21) Appl. No.: 13/966,191

(22) Filed: Aug. 13, 2013

(65) Prior Publication Data

US 2015/0048131 A1 Feb. 19, 2015

(51) Int. Cl.
*B60R 7/06* (2006.01)
*B60R 11/02* (2006.01)
*B60R 11/00* (2006.01)

(52) U.S. Cl.
CPC .......... *B60R 11/02* (2013.01); *B60R 2011/0008* (2013.01)

(58) Field of Classification Search
CPC ............ B60R 7/06; B60R 7/00; B60R 11/00; B60R 2011/0005–2011/0008; B60R 7/08
USPC ................ 224/483, 929, 282, 493, 309, 311, 224/324–327
See application file for complete search history.

(56) References Cited

U.S. PATENT DOCUMENTS

| | | | | |
|---|---|---|---|---|
| 3,685,708 A | * | 8/1972 | Herrington | 224/483 |
| 4,103,982 A | * | 8/1978 | Rudd | 439/297 |
| 5,060,260 A | * | 10/1991 | O'Connell | 379/454 |
| 5,396,556 A | * | 3/1995 | Chen | 379/446 |
| 5,411,192 A | * | 5/1995 | Xiao | 224/153 |
| 5,542,589 A | * | 8/1996 | McKee | 224/275 |
| 5,806,447 A | * | 9/1998 | Cox | 112/217.1 |
| 5,979,724 A | * | 11/1999 | Loewenthal et al. | 224/483 |
| 6,098,860 A | * | 8/2000 | Phillips | 224/483 |
| 8,727,192 B2 | * | 5/2014 | Lai | 224/420 |
| 2011/0006091 A1 | * | 1/2011 | Schafer | 224/282 |
| 2012/0199621 A1 | * | 8/2012 | Yoon | 224/483 |
| 2012/0205412 A1 | * | 8/2012 | Choi | 224/483 |
| 2013/0093205 A1 | * | 4/2013 | Stephan | 296/37.12 |

* cited by examiner

*Primary Examiner* — Brian D Nash

(57) ABSTRACT

This invention is a mount base and strap assembly for attaching a holder apparatus for mobile devices such as a tablet computer, smartphone, navigation device or similar accessories to the dashboard or center console of a motor vehicle. The mount base is secured to the dashboard or console with one or more upper adjustable strap(s) and hook(s) to the defroster vent or other attachment point on the dashboard or on the console and one or more lower strap(s) and hook(s) to anchor points under the dashboard or center console. The adjustable straps provide for stability, portability, and flexible positioning. A user fastens an accessory holder apparatus of their choice on said mount base with fasteners suitable for said accessory holder.

10 Claims, 4 Drawing Sheets

CONFIGURABLE AND PORTABLE DEVICE FOR HOLDING ACCESSORIES ON MOTOR VEHICLE DASHBOARDS

CROSS-REFERENCE TO RELATED APPLICATIONS

This application claims the benefit of provisional patent application No. 61/682,953 filed 14 Aug. 2012 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

Description of Related Art

Prior art for vehicle dashboard mounted tablet computer, smart phone, navigation device, or other accessory or object holders consists of mounts attached to the dashboard or windshield with one or more suction cups, fasteners, reconstruction of the dash, inserts into beverage cup holders, cantilevered, straps, or attached with inserts into air vents on the face of the dashboard.

These methods of attachment either require permanent alteration of the dash, are difficult to install or remove, are in unsafe or in illegal positions (California and other states) that affect the driver's view ahead, are weak attachments that fail through normal use, or vibrate with vehicle motion and reduce usability.

The following is a table of relevant prior art. While all address attaching accessories to a vehicle dashboard only the Phillips and Cox inventions use straps and hooks to secure a holder to a dashboard. Phillips does not include a mount base suitable for mobile device holders and a minimum of five contact points with the dash or console for stability and safety. Phillips' two straps and mount with no legs provide too few contact points for stability for the holder and the strap materials are not mentioned in the patent. The proper materials are critical to secure heavy objects to the dash. Phillips requires only two straps but a minimum of three is necessary for lateral stability for heavy objects.

Cox is a table platform supported primarily by the floor, positioning is inflexible and restricted to the passenger side of a vehicle, it is unsafe during vehicle operation, and is unsuitable for mobile device use.

| Patent Number | Kind Code | Issue Date | Patentee |
|---|---|---|---|
| 6,098,860 | A | 2000 Aug. 08 | Phillips |
| 5,511,754 | A | 1996 Apr. 30 | Johannsen |
| 5,806,447 | A | 1998 Sep. 15 | Cox |

| Publication Number | Kind Code | Publication Date | Applicant |
|---|---|---|---|
| 7,097,082 | B2 | 2006 Aug. 29 | Wallaker |
| 7,654,425 | B2 | 2010 Feb. 02 | Huang |
| 8,276,863 | B2 | 2012 Oct. 02 | Niwai |
| 174,669 | A | 1979 Nov. 20 | Lalonde |
| 5,979,724 | A | 1999 Nov. 09 | Brownell |
| 4,303,109 | A | 1981 Dec. 01 | Cohen |
| 8,474,778 | B2 | 2013 Jul. 02 | Jacobson |
| 20110006091 | A1 | 2011-Jan.-01 | Schafer |
| 20120097723 | A1 | 2012 Apr. 26 | Khatchatrian |
| 20120175394 | A1 | 2012 Jul. 12 | Keune |
| 20120199621 | A1 | 2012 Aug. 09 | Yoon |
| 20130037590 | A1 | 2013 Feb. 14 | Yoon |
| 20080190978 | A1 | 2008 Aug. 14 | Brassard |
| 20070278274 | A1 | 2007 Dec. 06 | Dunn |
| 20050236541 | A1 | 2005 Oct. 25 | Chang |
| 20040040994 | A1 | 2004 Mar. 04 | Parcelles |

SUMMARY

This invention is a portable mount base system with at least three legs and three straps for securely attaching user selected cradle systems for mobile devices such as a tablet computer, smart phone, navigation device, or other accessory firmly to a vehicle dashboard or console.

The mount base consists of a crossbar rectangle of plastic, metal, or similar rigid and planar material with legs attached to the crossbar to elevate the mount base above the dashboard or console controls.

The invention includes an upper strap or straps that attach on one end to opposing sides of the mount base crossbar and at their distal ends include attached hooks. The hooks connect to suitable edges in the dash or console. The tension of the secured and tightened straps compress the mount base legs against the dashboard or console for positioning and stability.

The mount base may or may not include holes for attaching a third party mobile device mounting assembly. The preferred embodiment is to include a center hole and two holes of the industry standard AMPS hole pattern for user convenience.

BRIEF DESCRIPTION OF THE DRAWINGS

FIG. 1 includes views of the hook ends of the upper and lower straps attached to a dashboard in one possible configuration.

REFERENCE NUMERALS IN THE DRAWINGS

Figure 1:
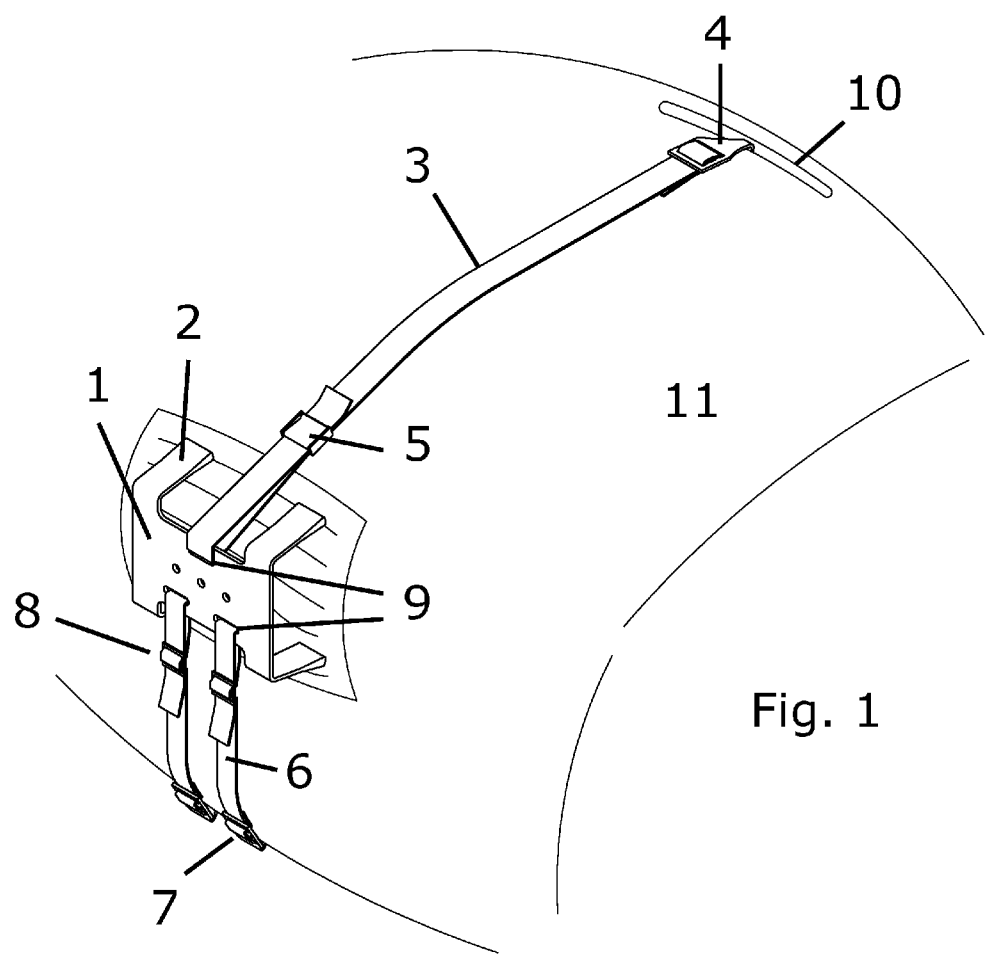
FIG. 1 is a perspective view showing the mount base and straps assembly as an embodiment example.
Figure 2:
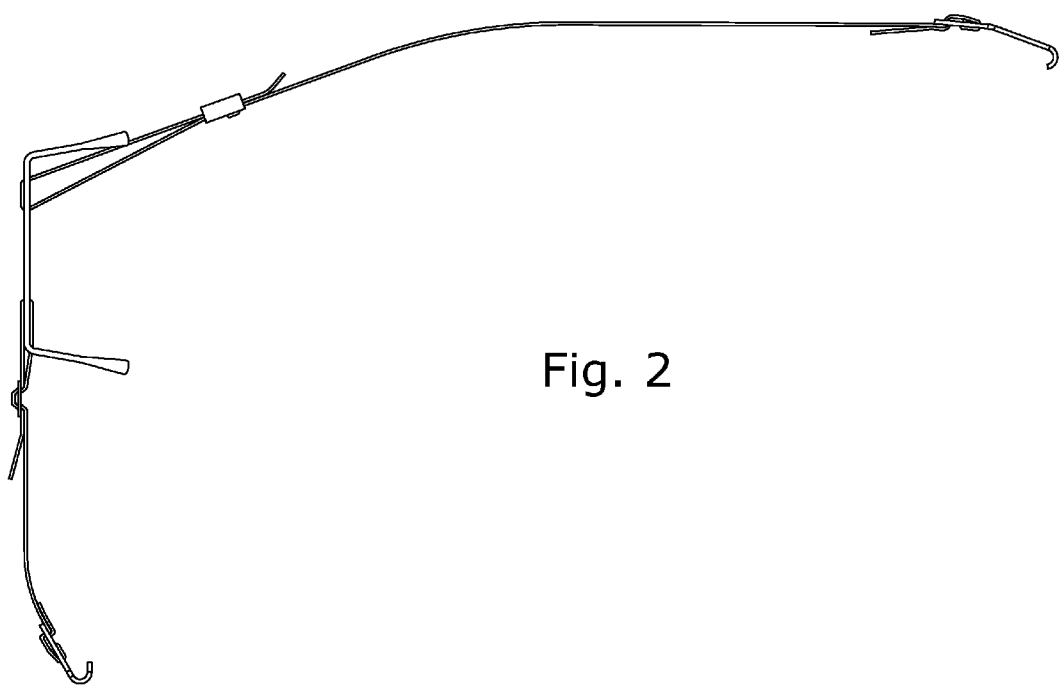
Figure 3:
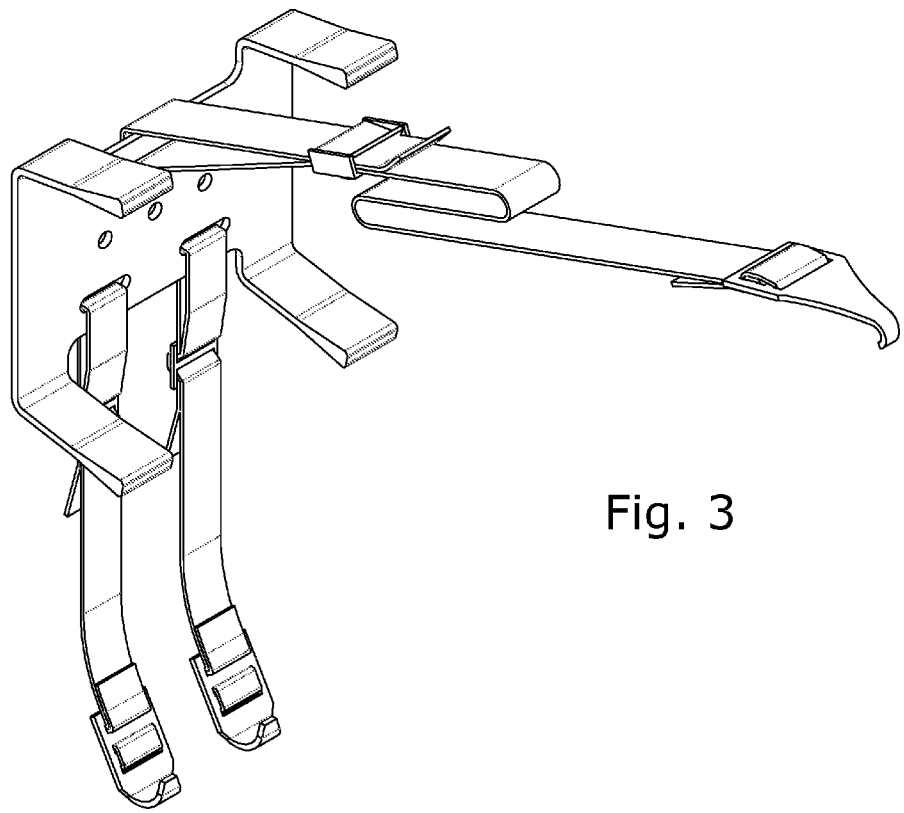
Figure 4:
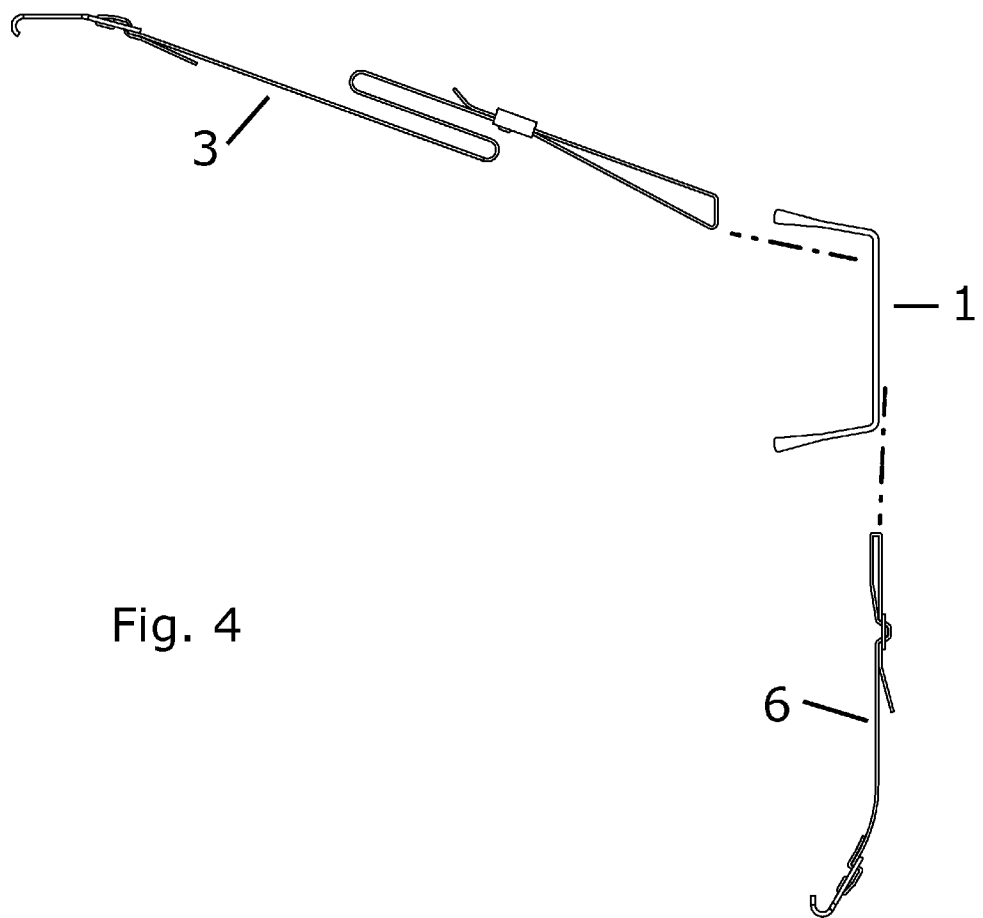

FIG. 1—Prospective view of the assembly installed on dashboard with component reference numerals
FIG. 2—Side view of the assembly
FIG. 3—Rear prospective view of the assembly
FIG. 4—Exploded view of the assembly

DETAILED DESCRIPTION

This embodiment contains:
1. FIG. 1: An adjustable top strap or straps 3 are secured on the mount base crossbar of planar material 1 by looping the strap through upper slot 9 and to a defroster vent 10 near the windshield with a hook 4 to connect the crossbar 1 with load bearing members or legs 2 to a dashboard 11. The top strap or straps can be adjusted with camlock buckles 5 or other suitable strap length adjusters. The mount base consists of the crossbar or planar material 1 and the support legs 2. The mount base is a platform for mounting cradles or holders of electronic devices or other accessories.

2. FIG. 1: Adjustable bottom straps 6 are secured on the mount 1 by looping the strap through lower slots 9 and to the dashboard or console edges below the mount with hook or hooks 7. The straps can be adjusted with cam-lock buckles 8 or other suitable strap length adjusters.
3. FIG. 1: The mount base crossbar 1 is held by compression against the dashboard by straps 3 and 6 and legs 2.
4. FIG. 1: Hooks 4 and 7 on the distal ends of the upper strap 3 and lower straps 6 have three slots in their bodies to hold the straps securely with tension as the straps are looped through them.
5. FIG. 4: Straps 3 and 6 loop through slots on mount 1 in this embodiment but can be attached with common fasteners, hook and loop straps around mount 1, or similar means.

The mount base in this embodiment can be made from standard materials such as plastics, metals, leather, or foam-core, common fasteners, Straps can be elastic, web, or similar materials, although the upper strap should be non-elastic and the lower straps should be elastic. Hooks can be made from plastic or metals such as aluminum. Variations in mount base materials or design attributes would not materially after the nature of the invention.

Operation

The user secures the top hook 4 inside the defroster vent to a crossbar or molding edge or other attachment point on the dash or console.

The user then adjusts the top strap 3 to position the mount base vertically on the dashboard or console where desired. The mount base legs 2 are designed to rest in recesses in the lower dash 11 or console for additional stability. However, no recesses are necessary for the operation of this mount configuration.

Finally, the user adjusts the bottom straps 6 and hooks 7 to a suitable edge such as under the dashboard 11 or on the side of a center console base.

The mount can be used anywhere on the dashboard or console as long as it doesn't impact the deployment of airbags or affect other operational or safety components of the vehicle.

Ramifications and Scope

This mount provides a stable, portable, and flexible positioning platform for mounting a variety of accessories that front seat occupants may wish to have available at their convenience. Those accessories can range from a tablet computer to a paper map depending on the design of user selected attachments or holders.

While the description contains specifics for one embodiment of the mount, these are not limitations on the scope. The scope should be determined based on the claims.

The invention claimed is:

1. An apparatus for mounting accessory holders on a motor vehicle dashboard or console comprising
   a. a mount base comprising a plurality of support legs comprised of rigid elongated bodies connected by a crossbar comprised of a substantially planar surface and
   b. first means for joining said support legs to said crossbar at sufficient angle to elevate said crossbar above vehicle controls on the dashboard and provide a stable platform and
   c. a plurality of straps and
   d. second means for attaching one end of each said strap to one of two opposing sides of said crossbar and
   e. third means for adjusting the length of said straps and
   f. a hook means for securing the distal ends of said straps on a dashboard or console and
   g. fourth means for attaching said hooks to said straps whereby the bottoms of said support legs of said mount base will be positioned at the user's selected location on a dashboard or console and held to the dashboard securely by tension force provided by said straps.

2. An apparatus for mounting accessory holders on a motor vehicle dashboard or console of claim 1 wherein said mount base
   a. includes sufficient said support legs for said mount base stability against the dashboard or console and
   b. said support legs are of sufficient length to elevate the said crossbar above the dashboard controls and
   c. said crossbar is of sufficient length and width to create a stable platform for mounting accessory holders and
   d. said mount base materials are of sufficient thickness and width to stably support the weight of common accessories and holders
      whereby said crossbar is elevated from the dashboard or console and is held securely against the dashboard or console by said support legs when said straps are attached to the dashboard or console.

3. An apparatus for mounting accessory holders on a motor vehicle dashboard or console of claim 1 wherein said straps include
   a. at least one upper strap connected to the one side of said crossbar and
   b. a pliable strap material of little or no elasticity such as nylon web and
   c. at least two lower straps connected to the opposing side of said crossbar and
   d. said lower straps material of predetermined elasticity and
   e. said straps are of sufficient thickness and width to stably support the weight of said mount base and an attached device holder apparatus and electronic device and
   f. the distal ends of said straps having a hook means and
   g. said straps are of sufficient length for the said mount base to be positioned on the dashboard or console at a user selected location
      whereby the distal end of said upper strap or straps connects to a suitable dashboard or console edge above or forward of said mount base with a hook means and the distal end of said lower straps connect to a suitable dashboard or console edge below the mount base with a hook means to securely hold said mount base with compression and lateral vector forces.

4. An apparatus for mounting accessory holders on a motor vehicle dashboard or console of claim 1, further comprising
   a. said third means of claim 1 for adjusting said straps in the form of buckles or triglides and
   b. said forth means of claim 1 for said hooks including three slots in the base or opposing end of said hooks to weave said strap through and back onto itself in order to lock said strap into position on the said hook body
      whereby the length of said straps and said hooks in combination can be adjusted at the hook attachment or at any location in the bight of said strap.

5. An apparatus for mounting accessory holders on a motor vehicle dashboard or console of claim 1, further comprising
   a. a round center hole and two adjacent round holes in said crossbar and
   b. a plurality of elongated slot holes on two opposing sides of said crossbar
      whereby said holes are sized for common fasteners and said straps are attached to said crossbar by inserting said straps' bights through said slot holes on one end of each said strap and looping it back on itself through adjustable attachment means and held in place by tension force.

6. An apparatus for mounting accessory holders on a motor vehicle dashboard or console of claim 1, further comprising
   a. said first means of claim 1 for attaching said support legs to said crossbar can be accomplished by means of fasteners or with molding or forming said support legs and said crossbar as a single unit with materials such as plastic or cutting and forming a single unit with metal, using common processes of the trade and
   b. said second means of claim 1 for attaching said straps to said crossbar can be accomplished by means of fasteners, with buckle or triglide mechanisms, hook and loop material, or with epoxy processes, using common processes of the trade.

7. An apparatus to support a mobile electronic device mount or cradle on a motor vehicle dashboard or console comprising
   a. a rigid planar material of sufficient width, length, and thickness to stably support an attached device holder of user choice and
   b. said planar material is held in an elevated position over the dashboard or console by a plurality of load bearing members comprised of elongated material and
   c. said load bearing members comprise support legs and
   d. said support legs are attached to said planar material by fasteners or molded together or forming said support legs and said planar material as a single unit with materials such as plastic or cutting and forming a single unit with metal or similar material, using common processes of the trade and
   e. said support legs are attached to said planar material at an angle adequate to elevate said planar material above the dashboard controls and
   f. said planar material and said support legs comprise a platform and
   g. a plurality of pliable straps adjustable by means of buckles, triglides, or similar objects located in the bight of said pliable straps and
   h. one end of each of said pliable straps is attached to said planar material by means of fasteners, epoxy, or tension force and
   i. said pliable straps are arranged on said planar material in locations to stably secure the apparatus to the dashboard or console and
   j. the distal end of each of said pliable straps is attached to a hook material by means of fasteners, epoxy, hook and eye material, or tension force
      whereby the tension force of said pliable straps secured to the dashboard or console material edges with said hooks will hold said platform securely and stably at a user selected location on the dashboard or console.

8. An apparatus to support a mobile electronic device mount or cradle on a motor vehicle dashboard or console of claim 7 further comprising
   a. at least one upper strap connected to the one side of said planar material and
   b. a pliable strap material of little or no elasticity and
   c. at least two lower straps connected to the opposing side of said planar material and
   d. said lower strap material of predetermined elasticity and
   e. said pliable straps are of sufficient thickness and width to stably support the weight of said platform and an attached device holder apparatus and electronic device and
   f. said pliable straps are of sufficient length for said platform to be positioned on the dashboard or console at a user selected location
      whereby the distal end of said upper strap or straps connects to a suitable dashboard or console edge above or forward of said platform with a hook means and the distal end of said lower strap or straps connect to a suitable dashboard or console edge below the platform with a hook means to securely and stably hold said platform against the dashboard or console with both compression and lateral vector forces.

9. An apparatus to support a mobile electronic device mount or cradle on a motor vehicle dashboard or console of claim 7 further comprising
   a. said hooks include three slots in the base or opposing end of said hooks to weave said pliable strap through and back onto itself
      whereby the length of said pliable straps and said hooks in combination can be adjusted at the hook attachment and the distal end of said pliable strap is secured to the hook body with tension force.

10. An apparatus to support a mobile electronic device mount or cradle on a motor vehicle dashboard or console of claim 7 further comprising
   a. a round center hole and two adjacent round holes in said planar material and
   b. a plurality of elongated slot holes on two opposing sides of said planar material
      whereby said round holes are sized for common fasteners and said pliable straps are attached to said planar material by inserting said pliable straps' bights through said elongated slot holes on one end of each said pliable strap and looping it back on itself through adjustable attachment means and held in place by tension force.

* * * * *